United States Patent
Kobayashi et al.

(10) Patent No.: US 6,945,240 B2
(45) Date of Patent: Sep. 20, 2005

(54) DEVICE AND METHOD FOR EXHAUST GAS CIRCULATION OF INTERNAL COMBUSTION ENGINE

(75) Inventors: Nobuhiro Kobayashi, Ageo (JP); Shigemi Kobayashi, Ageo (JP); Takaaki Matsumoto, Ageo (JP); Nozomi Kaise, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 393 days.

(21) Appl. No.: 10/031,689

(22) PCT Filed: Mar. 30, 2001

(86) PCT No.: PCT/JP01/02820

§ 371 (c)(1),
(2), (4) Date: Apr. 16, 2002

(87) PCT Pub. No.: WO01/90554

PCT Pub. Date: Nov. 29, 2001

(65) Prior Publication Data

US 2003/0000507 A1 Jan. 2, 2003

(30) Foreign Application Priority Data

May 24, 2000 (JP) ........................................ 2000-152634

(51) Int. Cl.$^7$ .............................................. F02M 25/07
(52) U.S. Cl. .................................. 123/568.21; 60/605.2
(58) Field of Search ....................... 123/568.21–568.31; 60/605.2

(56) References Cited

U.S. PATENT DOCUMENTS

| 5,203,309 A | 4/1993 | Goto et al. |
| 5,309,886 A | 5/1994 | Hitomi et al. |
| 6,564,784 B1 * | 5/2003 | Onodera et al. ........ 123/568.12 |

FOREIGN PATENT DOCUMENTS

| EP | 0 653 559 A1 | 5/1995 |
| EP | 0 869 275 A1 | 10/1998 |
| JP | 05-086990 | 4/1993 |
| JP | 07 208274 | 8/1995 |
| JP | 08-177597 | 7/1996 |
| JP | 08-291713 | 11/1996 |
| JP | 10-266866 | 10/1998 |

* cited by examiner

Primary Examiner—Mahmoud Gimie
Assistant Examiner—Arnold Castro
(74) Attorney, Agent, or Firm—Lawrence E. Laubscher, Jr.

(57) ABSTRACT

In an exhaust gas recirculation apparatus for an internal combustion engine mounted with a turbocharger in which a turbine is disposed in an exhaust passage and a compressor is disposed in an intake passage, when the exhaust gas recirculation is carried out, a port formed at the intake passage on the downstream side of the compressor is opened. As a result, since an intake air on the downstream side of the compressor is released to the atmosphere and a negative pressure in the exhaust passage is lowered, a differential pressure between an exhaust pressure in the intake passage and the negative pressure in the intake passage is increased, to improve an exhaust gas recirculation rate, so that a NOx discharge amount can be reduced.

4 Claims, 11 Drawing Sheets

DEVICE AND METHOD FOR EXHAUST GAS CIRCULATION OF INTERNAL COMBUSTION ENGINE

This application is a 317 of PCT/JP01/02820 filed on Mar. 30, 2001.

FIELD OF THE INVENTION

The present invention relates to an exhaust gas recirculation apparatus and an exhaust gas recirculation method for an internal combustion engine, and particularly to the technology of reducing a discharge amount of nitrogen oxides (to be referred as Nox hereinafter).

BACKGROUND TECHNIQUE

Here-to-fore, there has been widely adopted an exhaust gas recirculation (to be referred as EGR hereinafter) apparatus in which a part of exhaust gas in an internal combustion engine is returned to an intake system, and the part of exhaust gas functions as a kind of inert gas to lower a combustion temperature, thereby reducing a discharge amount of NOx.

Due to recent demands for light weight of a vehicle, and improvement of fuel consumption and performance, there have been proposed many internal combustion engines each provided with a turbocharger as a kind of supercharger. Particularly, a diesel engine is better in light of fuel consumption compared with a gasoline engine, however, has a low engine power and cannot meet high-speed rotation. Therefore, it is very beneficial to use a high torque obtained by installing a turbocharger for overcoming these drawbacks.

Since the EGR apparatus uses a differential pressure between an exhaust pressure in an exhaust passage and a negative pressure in an intake passage to return a part of exhaust gas to the intake system, an internal combustion engine mounted with a turbocharger has the following problems. Namely, in a case where the turbocharger has high efficiency, an outlet pressure (negative pressure) of a compressor disposed in the intake passage becomes higher than an inlet pressure (exhaust pressure) of a turbine disposed in the exhaust passage, and therefore, it becomes impossible to return the part of the exhaust gas to the intake system due to the differential pressure. Therefore, as disposed in Japanese Unexamined Patent Publication No. 10-266866, there is proposed the technology in which an intake throttle valve is disposed on the downstream side of a compressor and, at a low load operation, the intake throttle valve is closed to raise up the negative pressure in the intake passage (namely, to lower the intake pressure), thereby improving an EGR rate.

In such a conventional technology, however, although it is possible to increase the differential pressure by the intake throttle valve, an opening degree of the intake throttle valve becomes extremely small depending on engine operation conditions, possibly resulting in problems of such as engine power reduction and emission performance deterioration. Further, since an engine operation region where the differential pressure between the compressor outlet pressure and the turbine inlet pressure can be sufficiently established is narrow, it is very difficult to reduce NOx in the exhaust gas any further.

The present invention, from a viewpoint of the foregoing problems, has an object of providing an exhaust gas recirculation apparatus and an exhaust gas recirculation method for an internal combustion engine wherein a differential pressure between an exhaust pressure in an exhaust passage and a negative pressure in an intake passage is increased, to improve an EGR rate, thereby reducing an NOx discharge amount.

DISCLOSURE OF THE INVENTION

In order to achieve the above object, according to an apparatus of the present invention, an exhaust gas recirculation apparatus for an internal combustion engine mounted with a turbocharger in which a turbine is disposed in an exhaust passage and a compressor is disposed in an intake passage, comprises:

a passage opening and closing device that opens or closes an exhaust gas recirculation passage communicating the exhaust passage on the upstream side of the turbine with the intake passage on the downstream side of the compressor;

a port opening and closing device that opens or closes a port formed on the intake passage on the downstream side of the compressor;

an operating condition detecting device that detects an engine operating condition; and a control unit that incorporates a microcomputer therein, wherein the control unit judges whether or not the exhaust gas is to be recirculated based on the engine operating condition detected by the operating condition detecting device, and when it is judged that the exhaust gas is to be recirculated, performs a control to open the exhaust gas recirculation passage by the passage opening and closing device and at the same time to open the port by the port opening and closing device.

On the other hand, according to a method of the present invention, an exhaust gas recirculation method for an internal combustion engine mounted with a turbocharger in which a turbine is disposed in an exhaust passage and a compressor is disposed in an intake passage, comprises:

judging whether or not the exhaust gas is to be recirculated based on an engine operating condition;

opening an exhaust gas recirculation passage communicating an exhaust passage on the upstream side of the turbine with an intake passage on the downstream side of the compressor when it is judged that the exhaust gas is to be recirculated; and opening also a port formed on the intake passage on the downstream side of the compressor.

According to the above construction, it is judged whether the exhaust gas is to be recirculated based on the engine operating condition, and when it is judged that the exhaust gas is to be recirculated, the exhaust gas recirculation passage communicating the exhaust passage on the upstream side of the turbine with the intake passage on the downstream side of compressor is opened and the port formed on the intake passage on the downstream side of the compressor is also opened. Then, when the port is opened, since an intake air on the downstream side of the compressor is released into the atmosphere, a negative pressure in the intake passage is lowered, and on the other hand, since an exhaust pressure in the exhaust passage is not lowered so much, a differential pressure between the exhaust pressure in the exhaust passage and the negative pressure in the intake passage is increased. Therefore, a large amount of the exhaust gas is recirculated into the intake passage through the exhaust gas recirculation passage, to improve an exhaust gas recirculation rate, so that an NOx discharge amount can be reduced.

Here, It is preferable to form an intake air return passage that returns the intake air taken out of the port to an intake passage on the upstream side of the compressor.

According to this construction, since the intake air taken out of the port formed on the intake passage is returned to the intake passage on the upstream side of the compressor through the intake air return passage, the intake air compressed by the compressor is reused. Therefore, the efficiency of turbocharger can be prevented from being lowered, to restrain an engine power reduction. Further, the fuel consumption can be effectively improved in a low load operation region, and also, the reduction of fuel consumption can be suppressed in the other load operation regions.

It is preferable that an opening angle of the port is controlled in multi-stepwise based on the engine operating condition.

According to this construction, since the opening angle of the port formed on the intake passage is controlled in multi-stepwise based on the engine operating condition, the differential pressure between the exhaust pressure in the exhaust passage and the negative pressure in the intake passage is properly controlled, to thereby perform the exhaust gas recirculation effectively, while preventing the reduction of engine driveability and the deterioration of emission performance.

Moreover, it is preferable that the port is opened or closed by a port opening and closing device comprising at least one of a shutter, a butterfly valve and a poppet valve.

According to this construction, since the port opening and closing device comprises at least one of typical shutter, butterfly valve and poppet valve, its manufacturing cost can be restrained as much as possible while maintaining the reliability and durability thereof.

The other objects and features of the invention will be apparent from the following explanation of the embodiments with the accompanying drawings.

BEST MODES FOR CARRYING OUT THE INVENTION

The present invention will now be described with reference to the accompanied drawings.

Figure 1:
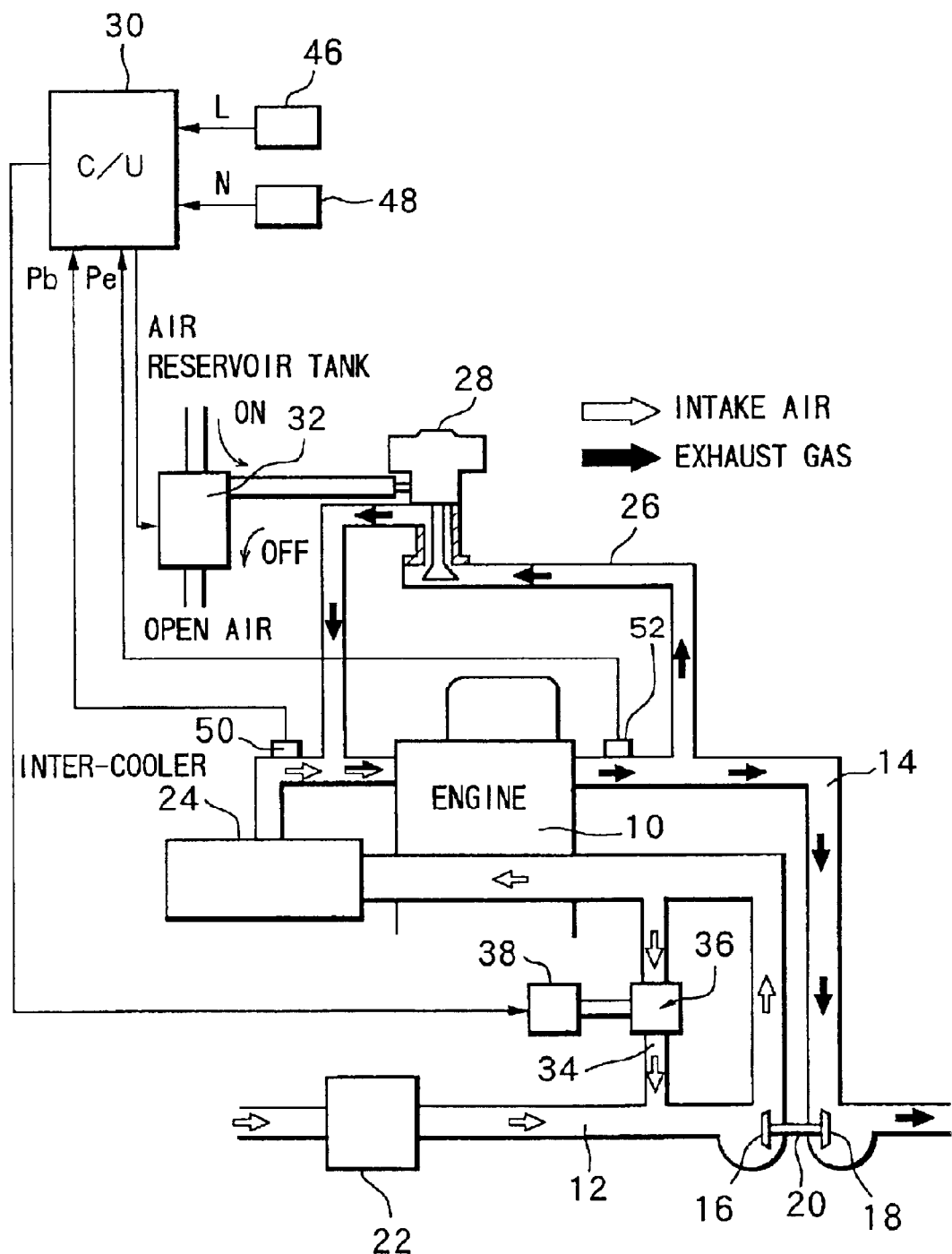
FIG. 1 is an entire block diagram of a diesel engine embodying an EGR technology according to the present invention.

FIG. 1 shows an entire block diagram of a diesel engine embodying an EGR technology according to the present invention.

A compressor 16 and a turbine 18 composing a turbocharger are respectively disposed in an intake passage 12 and an exhaust passage 14 of a diesel engine 10. The turbine 18 absorbs the exhaust gas energy flowing through the exhaust passage 14 to drive the compressor 16 integrally connected thereto through a shaft 20. The intake air from which impurities such as dust is eliminated by an air cleaner 22 is compressed by the compressor 16 disposed in the intake passage 12 to be in a supercharged state and then is introduced into a combustion chamber of the diesel engine 10. At this time, since the charging efficiency of the intake air compressed by the compressor 16 is lowered due to the temperature rise of compressed intake air by the adiabatic compression, an intercooler 24 is disposed in the intake passage 12 on the downstream side of the compressor 16 for the purpose of lowering the temperature of intake air after compressed.

The exhaust passage 14 on the upstream side of the turbine 18 and the intake passage 12 on the downstream side of the intercooler 24 (namely, the intake passage 12 on the downstream side of the compressor 16) are communicated with each other by an EGR passage 26. An EGR valve 28 that opens or closes the EGR passage 26 is disposed in the EGR passage 26 for controlling an EGR amount. The EGR valve 28 is opened or closed by the air supplied from an air reservoir tank not shown through an EGR control solenoid valve 32 to be drive controlled by a control unit 30 incorporating a microcomputer therein. Namely, when the EGR control solenoid valve 32 is turned ON, the air is supplied from the air reservoir tank to the EGR valve 28, then the EGR passage 26 is opened and the EGR is performed. On the other hand, when the EGR control solenoid valve 32 is turned OFF, the air supplied from the air reservoir tank to the EGR valve 28 is shut off, then the EGR passage 26 is closed and the EGR is suspended. The EGR valve 28 and the EGR control solenoid valve 32 constitute a passage opening and closing device.

Moreover, the upstream side and the downstream side of the compressor 16 disposed in the intake passage 12 are communicated with each other by a communicating passage 34 as an intake air return passage. A boost return valve 36 capable of switching the opening angle thereof at least at the full open position and at the full close position is disposed in the communicating passage 34. The opening angle of the boost return valve 36 is controlled through an actuator 38 controlled by the control unit 30. The boost return valve 36 and the actuator 38 constitute a port opening and closing device.

Various constitutions can be used as the boost return valve 36 and some specific constitutions will be explained as follows. However, the boost return valve 36 is not limited to the following constitutions.

Figure 2:
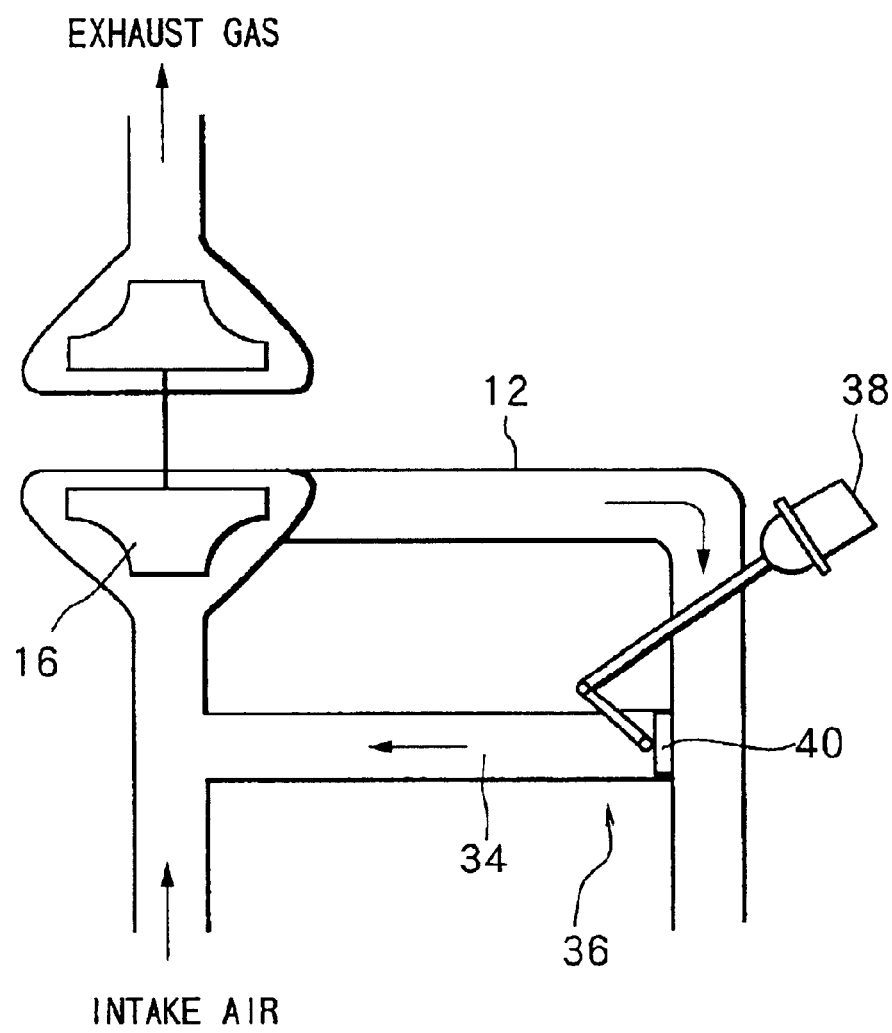
FIG. 2 is a block diagram showing a first embodiment of a boost return valve.
Figure 3:
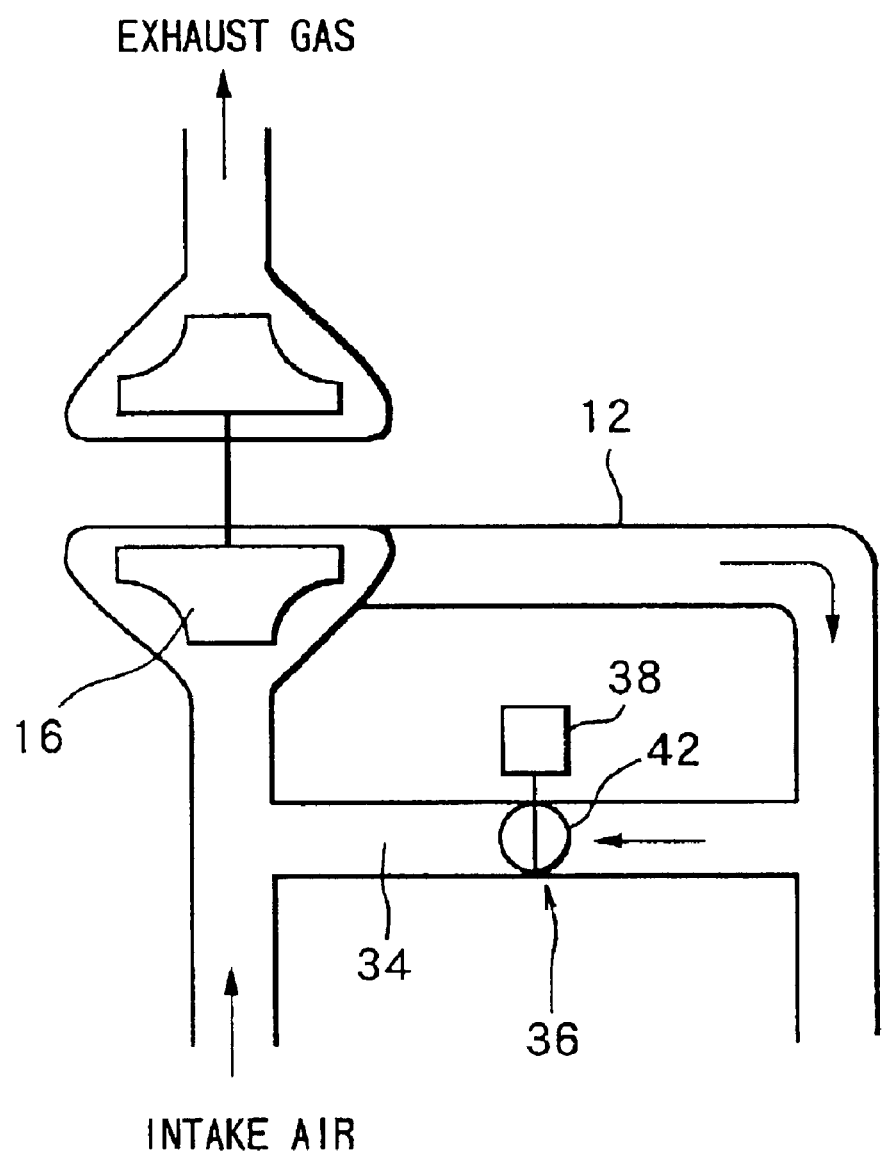
FIG. 3 is a block diagram showing a second embodiment of the boost return valve.

In a first embodiment shown in FIG. 2, a shutter 40 that opens or closes a port (not shown) formed on a peripheral wall of the intake passage 12, is disposed to the end portion of the communicating passage 34 facing the downstream side of the compressor 16. The shutter 40 is drive controlled by the actuator 38 so that an opening angle of the shutter 40 can be controlled at the full open position and at the full close position, preferably controlled in multi-stepwise between the full open position and the full close position. As shown in a second embodiment in FIG. 3, a butterfly valve 42 may be disposed in the intermediate position of the communicating passage 34 instead of the shutter 40 so that an opening angle of the butterfly valve 42 is drive controlled by the actuator 38, as in the first embodiment.

Figure 4:
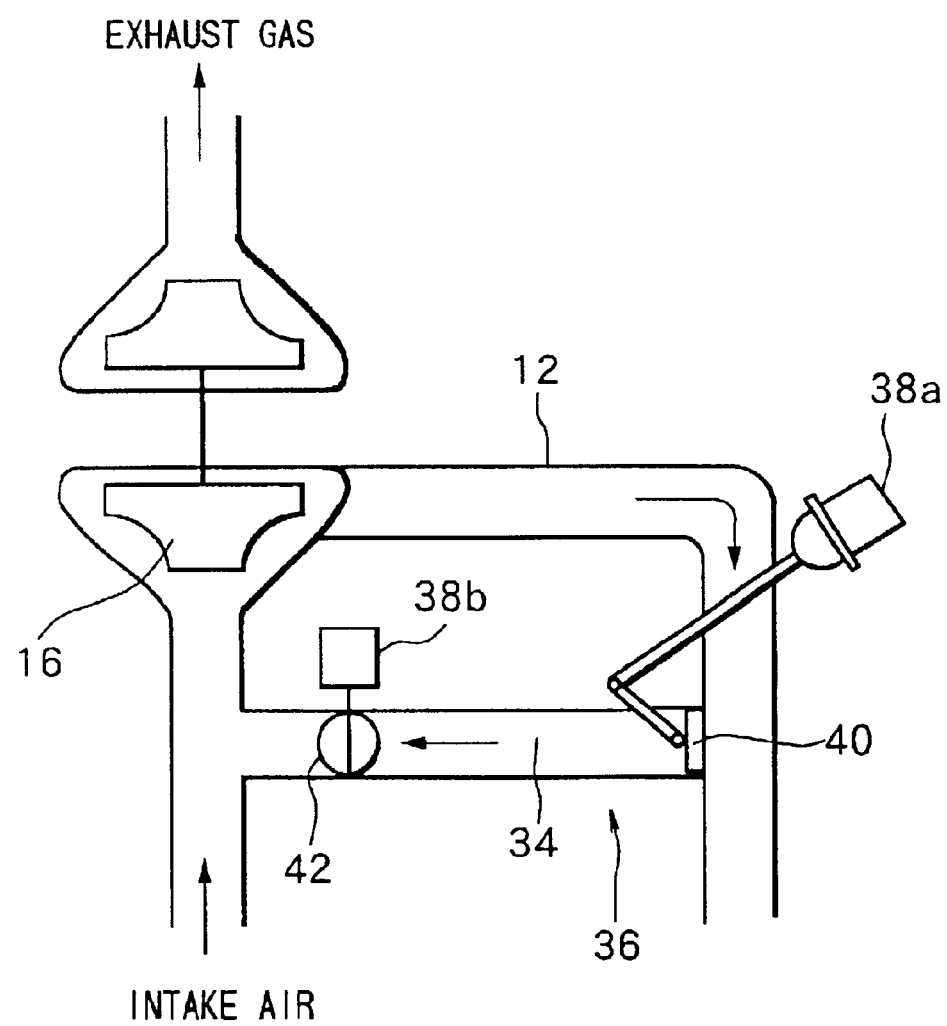
FIG. 4 is a block diagram showing a third embodiment of the boost return valve.

Further, in a case where the shutter 40 in the first embodiment is controlled at the full open position and at the full close position, the butterfly valve 42 may be disposed in the intermediate position of the communicating passage 34 in addition to the shutter 40 as shown in a third embodiment shown in FIG. 4. In this case, the shutter 40 is drive controlled at the full open position and at the full close position by an actuator 38a, and on the other hand, the butterfly valve 42 is drive controlled in multi-stepwise between the full open position and the full close position by an actuator 38b. Namely, in the third embodiment, the shutter 40 performs the opening or closing operation of the communicating passage 34 and the butterfly valve 42 performs the opening angle control of the communicating passage 34. Accordingly, since the working accuracy requested to the communicating passage 34 and the butterfly valve 42 becomes lower compared with the constitution where the communicating passage 34 is opened or closed only by the butterfly valve 42, it becomes possible to constitute the boost return valve 36 at a low cost.

Figure 5:
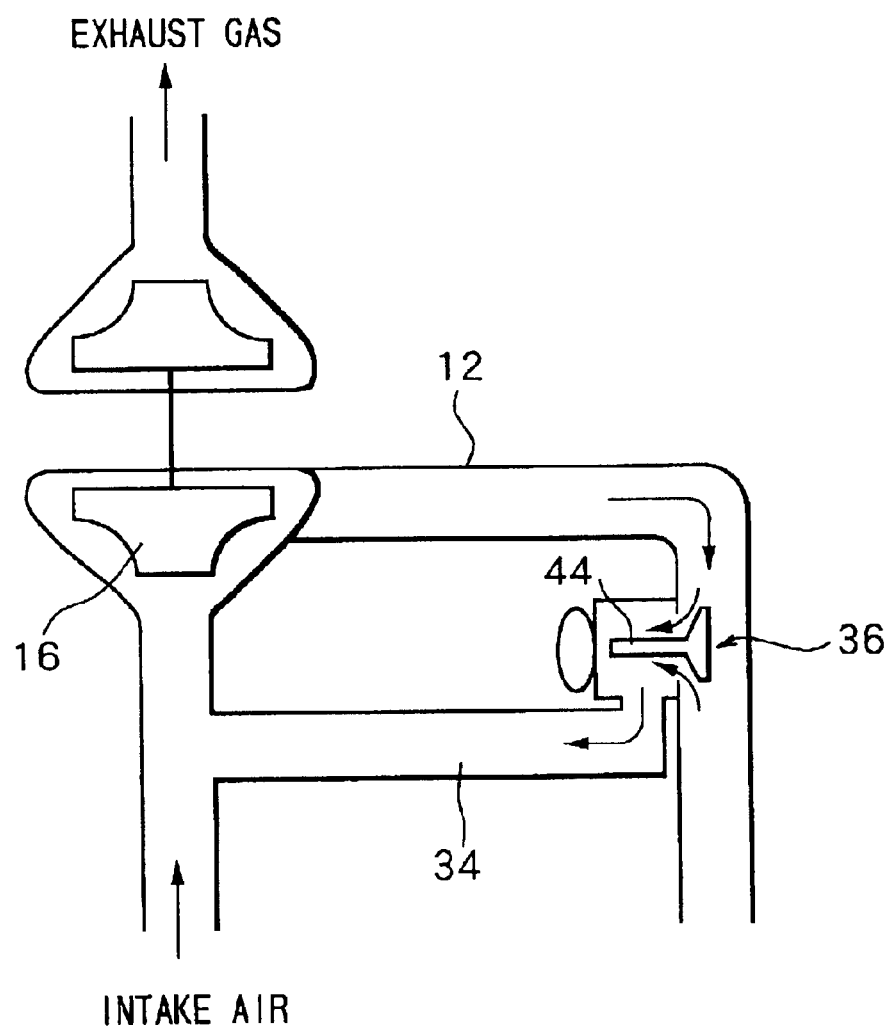
FIG. 5 is a block diagram showing a fourth embodiment of the boost return valve.

In addition, as in a fourth embodiment shown in FIG. 5, a poppet valve 44 may be disposed at the end portion of the communicating passage 34 facing the downstream side of the compressor 16, so that an opening angle of the poppet valve 44 is controlled in multi-stepwise by duty-control like the EGR valve 28.

In this way, if the typical shutter 40, butterfly valve 42, poppet valve 44 are used as the boost return valve 36, the rise in cost of the boost return valve 36 can be restrained as much as possible, while maintaining the reliability and durability thereof.

The boost return valve 36 is controlled in association with the EGR valve 28. Namely, when the EGR is performed, the intake air that has been compressed by the compressor 16 to be in a supercharged state is returned to the upstream side of the compressor 16 through the communicating passage 34. Therefore, the negative pressure in the intake passage 12 is lowered, and the differential pressure between the exhaust pressure in the exhaust passage 14 and the negative pressure in the intake passage 12 is increased. This operation is called "boost return" hereinafter.

In order to control the EGR apparatus, outputs from a load sensor 46 that detects an engine load L, a rotation speed sensor 48 that detects an engine rotation speed N, a negative pressure sensor 50 that detects a negative pressure Pb on the downstream side of the compressor 16, and an exhaust pressure sensor 52 that detects an exhaust pressure Pe on the upstream side of the turbine 18 are respectively input to the control unit 30 as an engine operating condition detecting device. Then, at the control unit 30, the EGR valve 28 and the boost return valve 36 are controlled based on respective signals from these sensors according to the processing described later. At the control unit 30, a judgment step and an opening and closing step are realized by software.

Figure 6:
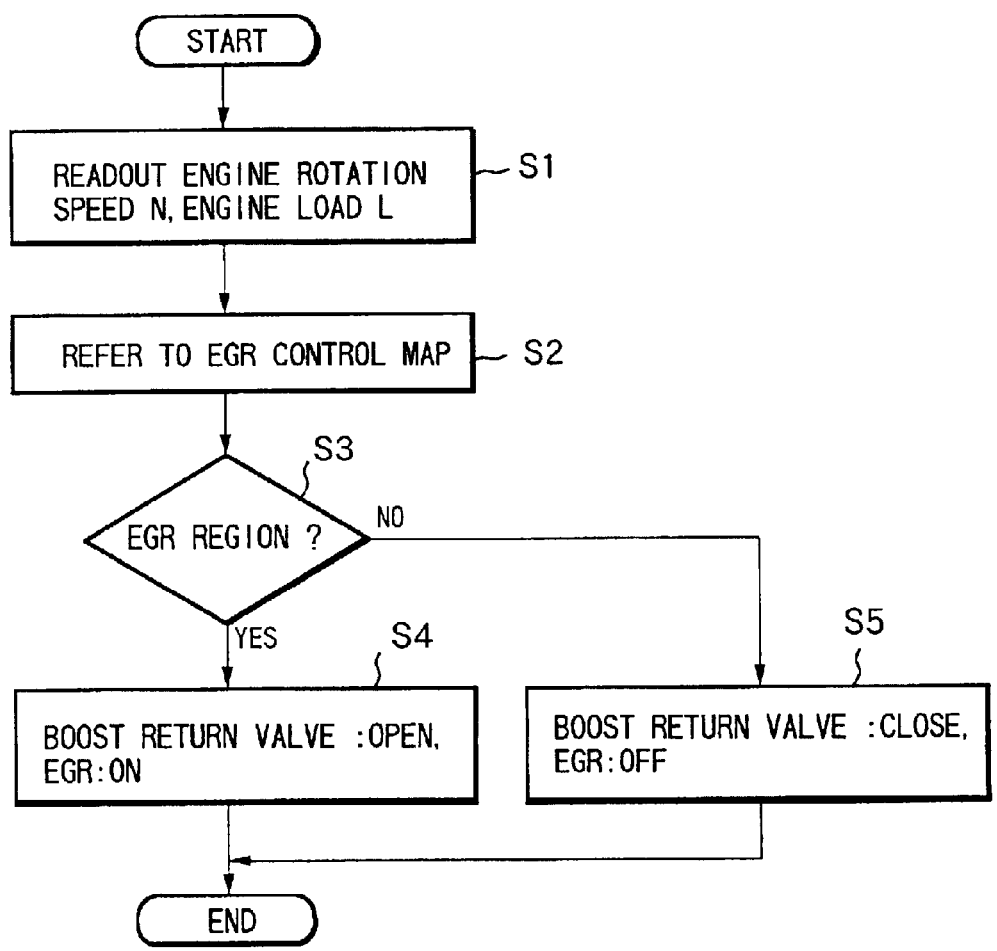
FIG. 6 is a flowchart showing a first embodiment of a control routine of an EGR apparatus.

FIG. 6 shows a control routine of the EGR apparatus executed by software at the control unit 30 in order to control the boost return valve 36 at the full open position or at the full close position. This control is executed repeatedly for each predetermined period of time.

At Step 1 (abbreviated as S1 in the figure, and the same rule is applied to the followings), the engine rotation speed N and the engine load L are read out from the rotation speed sensor 48 and the load sensor 46.

Figure 7:
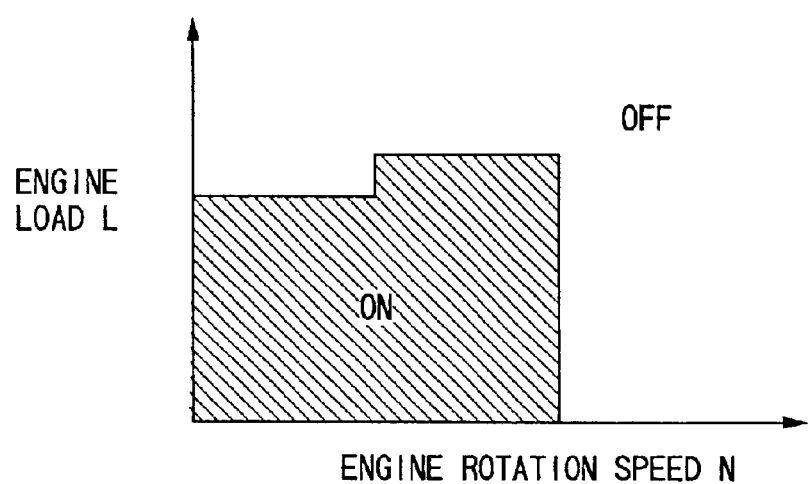
FIG. 7 is an explanation view of an EGR control map.

At Step 2, an EGR control map as shown in FIG. 7 is referred to and it is judged whether or not the engine operating condition determined by the engine rotation speed N and the engine load L is within a region where the EGR is performed (to be referred as EGR region hereinafter). In the EGR control map shown in FIG. 7, it is judged whether or not the engine operating condition is within the EGR region based on a control state (on/off) of the EGR control solenoid valve 32.

At Step 3, a branching process is performed in accordance with the engine operating condition. If the engine operating condition is within the EGR region, the routine proceeds to Step 4 (Yes) while if the engine operating condition is not within the EGR region, the routine proceeds to Step 5 (No). The process of Step 2 and Step 3 corresponds to the judgment step.

At Step 4, a control to perform the EGR is executed. Namely, the actuator 38 is controlled in order to open the communicating passage 34, and also the EGR control solenoid valve 32 is turned "ON" in order to open the EGR passage 26 by the EGR valve 28. The process of Step 4 corresponds to the opening and closing step.

At Step 5, a control to stop the EGR is executed. Namely, the actuator 38 is controlled in order to close the communicating passage 34, and also the EGR solenoid valve 32 is turned "OFF" in order to close the EGR passage 26 by the EGR valve 28.

Figure 8:
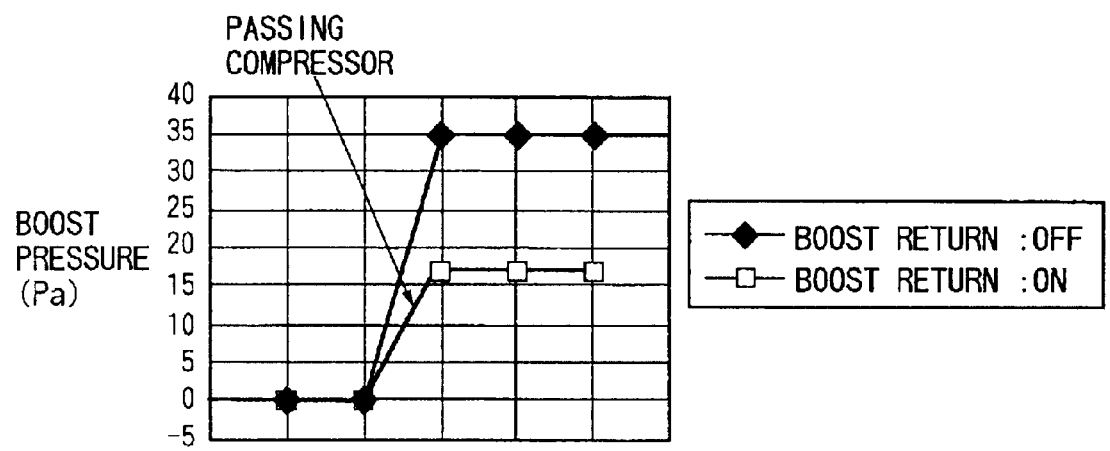
FIG. 8 is a view explaining the reduction of negative pressure by the boost return.

According to the process of Step 1 to Step 5 as explained above, if the engine operating condition is within the EGR region, the EGR passage 26 is opened, as well as the communicating passage 34 is opened by the boost return valve 36. Then, when the communicating passage 34 is opened, as shown in FIG. 8, the intake air on the downstream side of the compressor 16 is returned to the upstream side thereof to lower the negative pressure Pb. On the other hand, since the exhaust pressure Pe in the exhaust passage 14 is not reduced as much as the negative pressure Pb is reduced, a differential pressure $\Delta P$ between the negative pressure Pb and the exhaust pressure Pe is increased. Therefore, the EGR rate and the EGR applicable region get larger compared with a conventional EGR apparatus, and at the same time, a large amount of exhaust gas is recirculated to the intake passage 12 through the EGR passage 26, so that the NOx discharge amount is reduced due to the improvement of EGR rate. Further, since the differential pressure $\Delta P$ for improving the EGR rate is produced by the boost return, an intake air amount per unit time is reduced and as a result, the fuel consumption can be improved by advancing the fuel injection timing.

Figure 9:
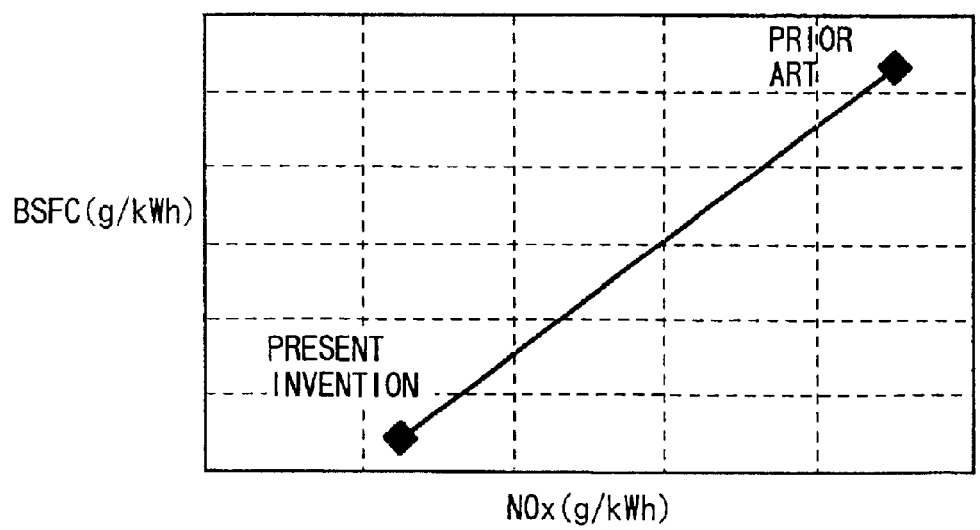
FIG. 9 is a view explaining the improvement of NOx and the improvement of brake specific fuel consumption by the boost return.
Figure 10:
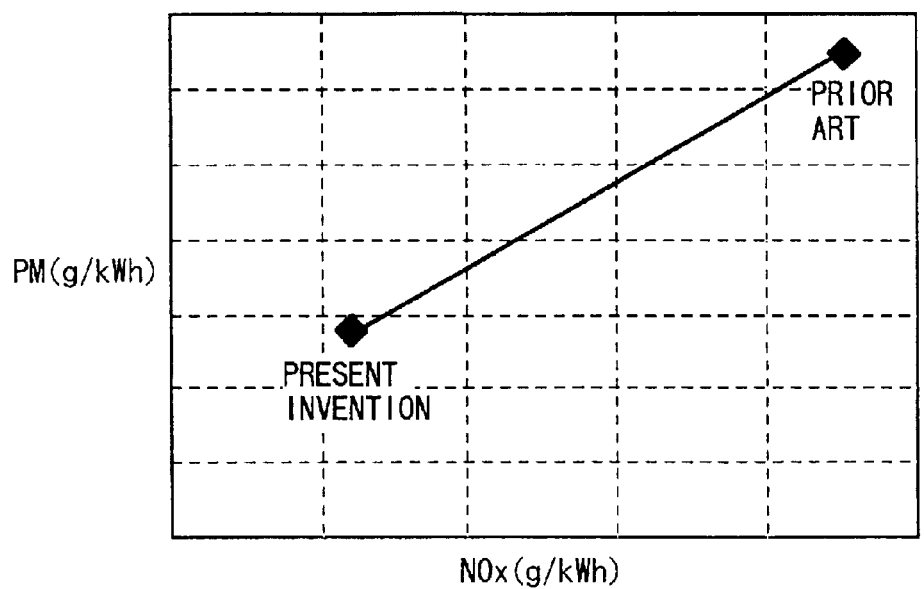
FIG. 10 is a view explaining the improvement of NOx and the improvement of pariculate matter by the boost return.

According to the EGR apparatus of such a constitution, as shown in FIG. 9 and FIG. 10, at the 13 mode (measuring mode defined in Japan), the NOx discharge amount can be reduced by about 26% and also an emission amount of particularte matter (PM) can be reduced by about 56% while improving brake specific fuel consumption (BSFC) at a low load operation.

Figure 11:
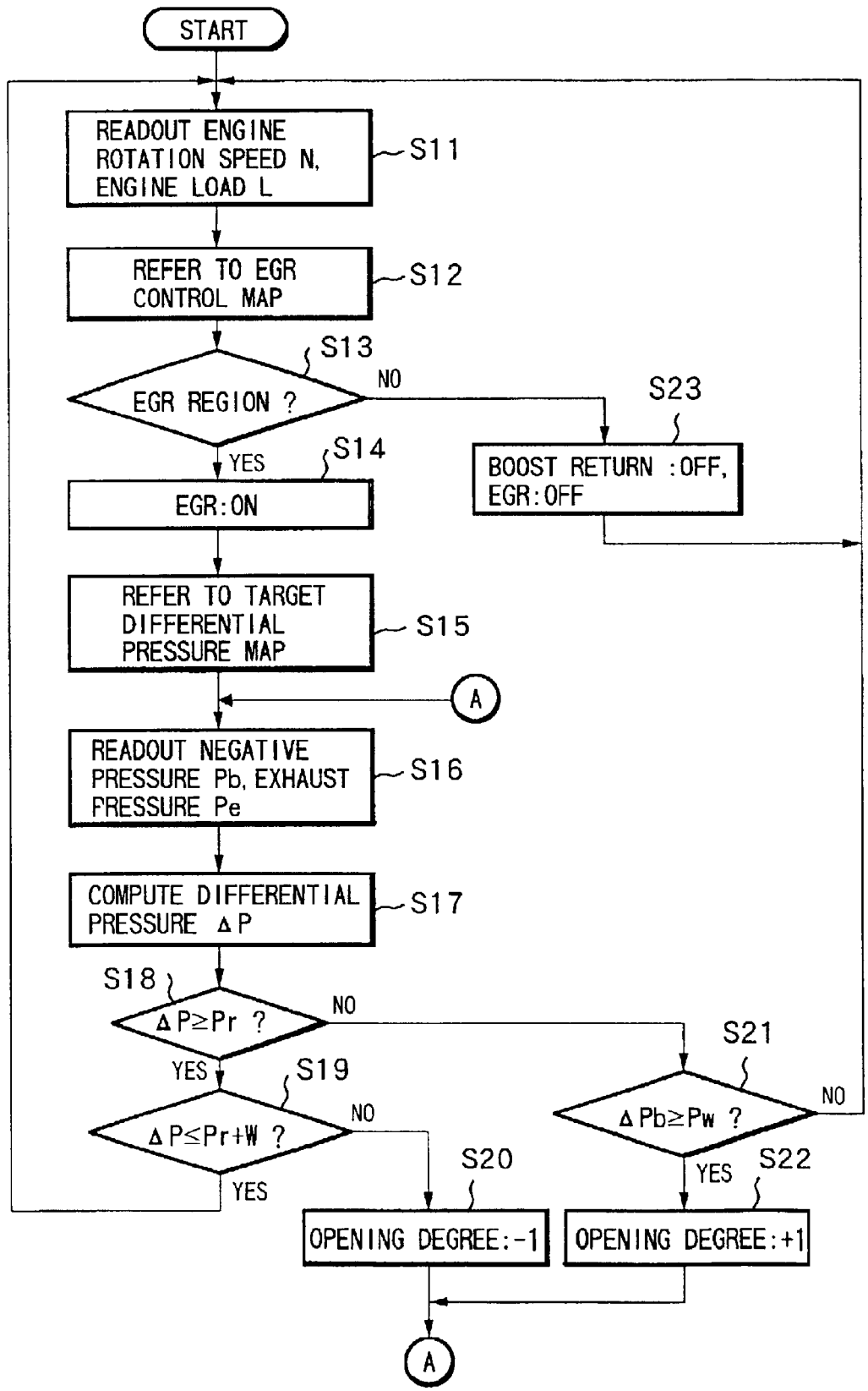
FIG. 11 is a flowchart showing a second embodiment of the control routine of the EGR apparatus.

FIG. 11 shows a control routine of the EGR apparatus executed by software in the control unit 30 in order to control in multi-stepwise the boost return valve 36 between the full open position and the full close position.

At Step 11, the engine rotation speed N and the engine load L are respectively read out from the rotation speed sensor 48 and the load sensor 46.

At Step 12, the EGR control map as shown in FIG. 7 is referred to and it is judged whether or not the engine operating condition determined by the engine rotation speed N and the engine load L is within the EGR region.

At Step 13, a branch process is performed in accordance with the engine operating condition. When the engine operating condition is within the EGR region, the routine proceeds to Step 14 (Yes), while when the engine operating condition is not within the EGR region, the routine proceeds to Step 23 (No). The process of Step 12 and Step 13 corresponds to the judgment step.

At Step 14, the EGR is started. Namely, the EGR solenoid valve 32 is turned "ON" in order to open the EGR passage 26 by the EGR valve 28.

Figure 12:
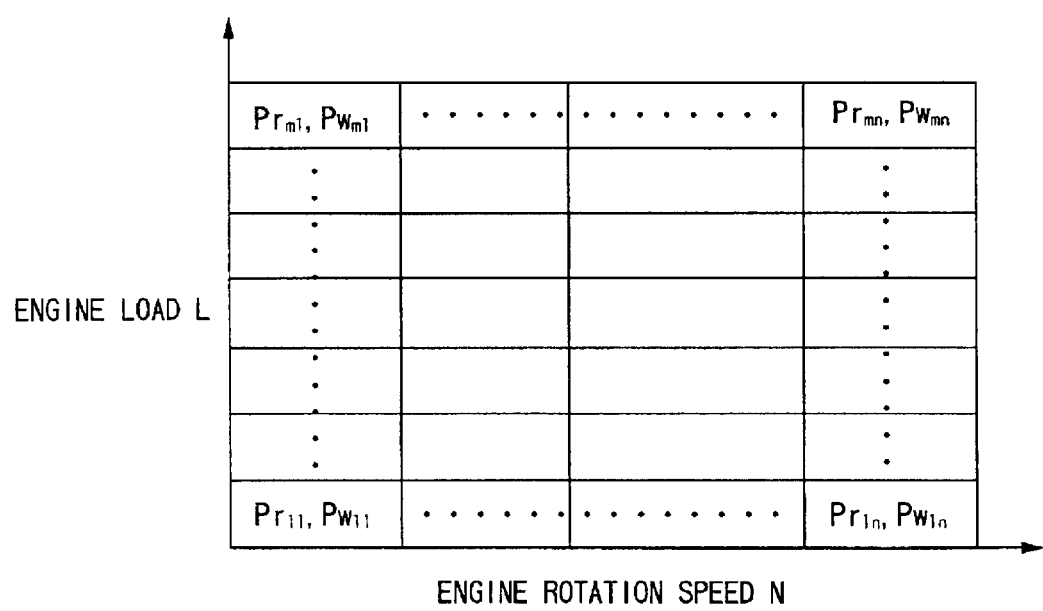
FIG. 12 is an explanation view of a control map of target differential pressure.

At Step 15, a target differential pressure control map as shown in FIG. 12 is referred to and a target differential pressure Pr and a minimum negative pressure Pw are set based on the engine rotation speed N and the engine load L.

At Step 16, a negative pressure Pb and an exhaust pressure Pe are read out from a negative pressure sensor 50 and an exhaust pressure sensor 52, respectively.

At Step 17, based on the read out negative pressure Pe and exhaust pressure Pe, the differential pressure ΔP is computed by the following formula.

$$\Delta P = Pe - Pb$$

At Step 18, it is judged whether or not the differential pressure ΔP is the target differential pressure Pr or above. When the differential pressure ΔP is the target differential pressure Pr or above, the routine proceeds to Step 19 (Yes), while when the differential pressure ΔP is less than the target differential pressure Pr, the routine proceeds to Step 21 (No).

At Step 19, it is judged whether or not the differential pressure ΔP is an addition value of the target difference pressure Pr and an allowable value W, or less. Here, the allowable value is a so-called limiter that prevents the differential pressure ΔP from becoming greater than necessary, thereby enabling to prevent the deterioration of emission performance. When the differential pressure ΔP is the addition value or less, it is judged that the differential pressure ΔP is controlled to a proper value and the routine returns to Step 11 (Yes). On the other hand, when the differential pressure ΔP is greater than the addition value, it is judged that the differential pressure ΔP is too great, the routine proceeds to Step 20 (No).

At Step 20, the opening angle of the boost return valve 36 is made smaller by one step in order to lower the differential pressure ΔP. Thereafter, the routine returns to Step 16, wherein the differential pressure control is continued.

At Step 21 where the process of when the differential pressure ΔP is less than the target differential pressure Pr is executed, it is judged whether or not the negative pressure Pb is the minimum negative pressure Pw or more. When the negative pressure Pb is the minimum negative pressure Pw or more, the routine proceeds to Step 22 (Yes), while when the negative pressure Pb is less than the minimum negative pressure Pw, the routine returns to Step 11 (No).

At Step 22, the opening angle of the boost return valve 36 is made larger by one step in order to increase the differential pressure ΔP. Afterwards, the routine returns to Step 16, wherein the differential pressure control is continued.

The process of Step 14~Step 22 corresponds to the opening and closing step.

At Step 23 where the process of when the engine operating condition is not within the EGR region is executed, the control to stop the EGR is executed. Namely, the actuator 38 is controlled to fully close the communicating passage 34 and also the EGR control solenoid valve 32 is turned "OFF" to close the EGR passage 26 by the EGR valve 28.

According to the process of Step 11~Step 23 as explained above, in addition to functions and effects by the EGR control shown in FIG. 6, the differential pressure ΔP is properly controlled in accordance with the engine operating condition. Namely, since the differential pressure ΔP is controlled to be in the scope of the following formula, the EGR can be performed effectively while preventing the engine driveability and the emission performance from being deteriorated. Thus it becomes possible to reduce effectively the NOx discharge amount.

$$Pr(\text{target differential pressure}) \leq \Delta P(\text{differential pressure}) \leq Pr + W(\text{target differential pressure} + \text{allowable value})$$

Moreover, if the negative pressure Pb is less than the minimum negative pressure set in accordance with the engine operating condition, since the differential pressure control is not performed, an increase in a discharge amount of particularte matter discharged from the engine is prevented.

In the above embodiment, when the EGR is performed, the intake air on the downstream side of the compressor 16 is returned to the upstream side thereof. However, the intake air on the downstream side of the compressor 16 may be released to the atmosphere. In this case, by releasing the intake air on the downstream side of the compressor 16 to the atmosphere, the negative pressure in the intake passage 12 is lowered and the differential pressure ΔP between the exhaust pressure Pe in the exhaust passage 14 and the negative pressure in the intake passage 12 is increased. Accordingly, the same effect as in the previous embodiment is achieved. Namely, such a constitution is the smallest constitution of the present invention.

Further, needless to say, the EGR apparatus and the EGR method according to the invention can be applied to a gasoline engine and the like.

INDUSTRIAL APPLICABILITY

As explained above, the EGR apparatus and the EGR method according to the invention are extremely useful because the differential pressure between the exhaust pressure in the exhaust passage and the negative pressure in the intake passage is increased to improve the EGR rate, so that a NOx discharge amount can be reduced.

What is claimed is:

1. An exhaust gas recirculation apparatus for an internal combustion engine mounted with a turbocharger in which a turbine is disposed in an exhaust passage and a compressor is disposed in an intake passage, comprising:

a passage opening and closing device that opens or closes an exhaust gas recirculation passage communicating the exhaust passage on the upstream side of said turbine with the intake passage on the downstream side of said compressor;

a shutter that opens or closes a port formed on the intake passage on the downstream side of said compressor;

a butterfly valve disposed in an intake air return passage that returns intake air from said port to the intake passage on the upstream side of said compressor, an opening angle of said butterfly valve being controlled in multi-step fashion between fully open and fully closed petitions;

an operating condition detecting device that detects an engine operating condition; and a control unit that incorporates a microcomputer therein, wherein said control unit determines whether or not the exhaust gas is to be recirculated based on the engine operating condition detected by said operating condition detecting device, and when it is determined that the exhaust gas is to be recirculated, said control unit operates said passage opening and closing device to open said exhaust as recirculation passage and simultaneously operates said shutter to open said port and controls the opening angle of said butterfly valve in accordance with the detected engine operating condition.

2. An exhaust gas recirculation apparatus for an internal combustion engine according to claim 1, and further comprising:
   a negative pressure detecting device that detects a negative pressure on the side of said compressor; and
   an exhaust pressure detecting device that detects an exhaust pressure on the upstream side of said turbine;
   wherein said control unit controls the opening angle of said butterfly valve so that a differential pressure between the exhaust pressure detected by said exhaust detecting device and the negative pressure detected by said negative pressure detecting device reaches a target differential pressure according to the engine operating condition.

3. An exhaust gas recirculation method for an internal combustion engine mounted with a turbocharger in which a turbine is disposed in an exhaust passage and a compressor is disposed in an intake passage, comprising the steps of:
   determining whether or not the exhaust gas is to be recirculated based on an engine operating condition;
   opening an exhaust gas recirculation passage connecting the exhaust passage on the upstream side of said turbine and the intake passage on the downstream side of said compressor when it is determined that the exhaust gas is to be recirculated;
   simultaneously opening a port formed on the intake passage on the downstream side of said compressor and controlling the opening angle of a butterfly valve arranged in an intake air return passage that returns intake air from said port to the intake passage on the upstream side of said compressor, said butterfly valve being opened in multi-step fashion in accordance with the engine operating condition.

4. An exhaust gas recirculation method for an internal combustion engine according to claim 3,
   wherein the opening angle of said butterfly valve is controlled so that a differential pressure between an exhaust pressure on the upstream side of said turbine and a negative pressure on the downstream side of said compressor reaches a target differential pressure in accordance with the engine operating condition.

* * * * *

UNITED STATES PATENT AND TRADEMARK OFFICE
CERTIFICATE OF CORRECTION

PATENT NO. : 6,945,240 B2
DATED : September 20, 2005
INVENTOR(S) : Nobuhiro Kobayashi et al.

It is certified that error appears in the above-identified patent and that said Letters Patent is hereby corrected as shown below:

<u>Title page,</u>
Item [22], PCT Filed, should read -- January 22, 2002 --.

Signed and Sealed this

Eighth Day of November, 2005

JON W. DUDAS
*Director of the United States Patent and Trademark Office*